July 21, 1959     W. H. GILLE     2,896,204

NAVIGATION SYSTEM

Filed Sept. 27, 1954

INVENTOR
WILLIS H. GILLE

BY *George H Fisher*

ATTORNEY

United States Patent Office 2,896,204
Patented July 21, 1959

2,896,204

NAVIGATION SYSTEM

Willis H. Gille, St. Paul, Minn., assignor to Minneapolis-Honeywell Regulator Company, Minneapolis, Minn., a corporation of Delaware Application September 27, 1954, Serial No. 458,428

1 Claim. (Cl. 343—16)

This invention relates to the field of radio communication, and more particularly to apparatus for use in radio navigation or object locating.

The field of radio communications presents a number of problems where object location is involved. The use of radar gives a general picture of objects remote from the transmitter, but can not be relied upon for sufficient definition in certain critical cases. The return signal from a bridge, for example, is so diffused that radar cannot guide a vessel between its piers.

Radio direction finding apparatus is reliable, but has heretofor required the operation of a radio transmitter at each point to be located. This is a prohibitively expensive requirement in the case of point-to-point navigation along a river, for example, where the channel twists, and many beacons are necessary.

An object of this invention is to provide simple, reliable, and economical means for facilitating point-to-point navigation of vehicles, and for monitoring the position of objects with respect to a known location. A subordinate object of the invention is to simplify navigation of object location systems by adapting them to the use of unattended beacons requiring no local source of energy and distinguishable from one another.

Various other objects, advantages, and features of novelty not particularly enumerated above which characterize my invention are pointed out with particularity in the claim annexed hereto and forming a part hereof. However, for a better understanding of the invention, its advantages, and objects attained by its use, reference should be had to the subjoined drawing, which forms a further part hereof, in which I have illustrated and described my invention. In the drawing:

Figure 1:
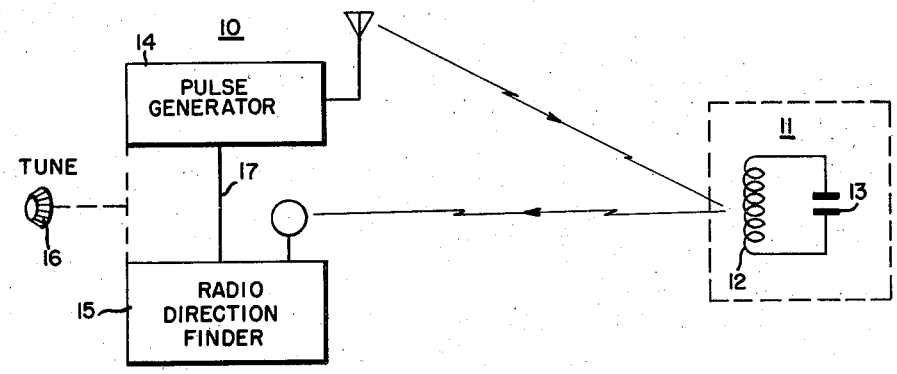
Figure 1 is a schematic showing of a basic communication system according to the inventions.

Figure 1 shows a search station 10 and a sought station 11 remote therefrom. Sought station 11 comprises a resonant circuit including an inductor 12 and a capacitor 13. These components must be of the best quality, as the operation of the entire system hinges on the necessity for a high Q in this resonant circuit. The dielectric of the capacitor, the insulation on the coil and the connecting wire, the coil form material, the material in the core of the inductor if such is used, and the material and structure of the housing in which elements 12 and 13 are mounted are all selected with a view of maximizing the Q of the resonant circuit.

Search station 10 is shown to comprise a pulse generator 14 which transmits spaced pulses of radio frequency energy, which are cut off sharply, and the radio direction finder 15 which operates to indicate the direction of any source of radio frequency energy to which it is tuned, within its range of operation. Elements 14 and 15 are simultaneously tunable by a knob 16, and an interconnection 17 operates to block the direction finder during the intervals of pulse transmission, and to unblock it as soon as the pulse is cut off.

The system is designed for short range operation, so that a representative distance between stations 10 and 11 may be one-quarter mile. System operation is as follows. The resonant frequency of station 11 being known, station 10 is tuned to the same frequency. Pulse generator 14 emits a pulse of radio frequency energy, disabling direction finder 15. When the energy reaches station 11, oscillations build up in the resonant circuit rapidly because the Q of the circuit is high.

Since the sought stations derive their energy entirely from the search station, and have no local source of electricity, they are referred to herein as parasitic stations.

When the pulse from generator 14 ceases, the oscillations in the resonant circuit at station 11 do not cease immediately, but are damped out at a rate determined by the load on the circuit. When the Q is high, a perceptable portion of the damping is the result of nondirectional radiation from the circuit, and this radiation, at the resonant frequency of the circuit, is detected by radio direction finder 15 which is no longer disabled. Over a large number of pulses the direction finder operates to seek out the tuned circuit as a source of radiations, and hence indicates the location of sought station 11 with respect to the standard direction, normally north.

By following the indications of the direction finder, and returning to the frequency of each ensuing station as a preceding station is reached, a vehicle carrying the search station may be guided along a path determined by a series of sought stations.

Figure 2:
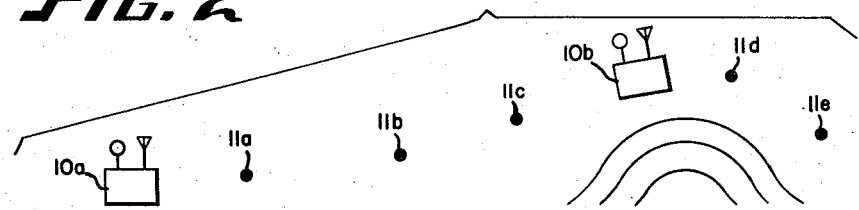
Figure 2 shows the apparatus as used in ice cap navigation.

In Figure 2 there are shown a number of sought stations 11a, 11b, 11c, 11d, and 11e located along a path to be followed in ice-cap navigation by traffic in the form of snowmobiles. A pair of search stations 10a and 10b are shown mounted on snowmobiles at spaced locations along the path. It will be apparent that sought stations are of such a nature that they may be deposited along the path by helicopter for example, and their operation is indifferent to being covered by drifting snow.

Figure 3:
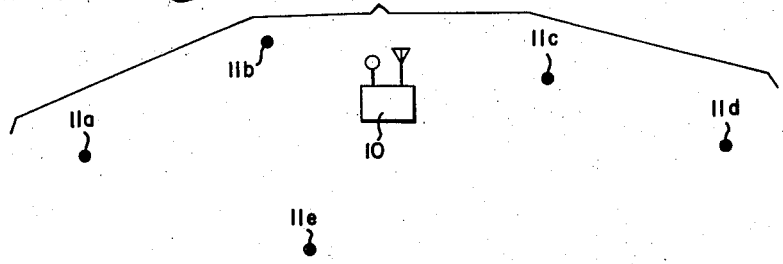
Figure 3 shows the apparatus as it is used for object location.

In Fig. 3 there are shown a number of sought stations 11a, 11b, 11c, 11d, and 11e mounted on mobile objects whose locations are to be continuously monitored from a central search station 10. Any one of the objects can be located in azimuth by tuning station 10 to the frequency of the sought station on the object.

While the disclosure is of a simple radio direction finder, it will be apparent that if a pair of such instruments are used, cross bearings on two sought stations can be obtained by alternately transmitting pulses of the two different frequencies. Thus navigation along the twisting channel of a river, for example, is made easy by mounting sought stations on the river bank at the ends of the channel sections extended.

Numerous objects and advantages of my invention have been set forth in the foregoing description, together with details of the structure and function of the invention, and the novel features thereof are pointed out in the appended claims. The disclosure, however, is illustrative only, and I may make changes in detail, within the principle of the invention, to the full extent indicated by the broad general meaning of the terms in which the appended claim is expressed.

I claim as my invention:

A point to point navigation system comprising, in combination: a search station carried by a vehicle and comprising a tunable pulse transmitter, a tunable directional receiver adapted to make evident the direction from which reception is taking place, and means blocking the receiver during only the interval of transmission of each pulse; and a plurality of unattended, pasasitic, continuously operative, omnidirectional sought stations each comprised of a weatherproof housing, a tuned inductance-capacitance circuit having a high Q and a natural frequency to which said transmitter and receiver are tunable within each said housing, said sought stations being located at points along a path to be traversed by the vehicle, and the sought stations within the effective radius of said search station having different natural frequencies, so that by following the signals of said directional receiver the vehicle may be navigated along the course determined by said sought stations.

References Cited in the file of this patent

UNITED STATES PATENTS

| | | |
|---|---|---|
| 2,396,112 | Morgan | Mar. 5, 1946 |
| 2,432,984 | Budenbom | Dec. 23, 1947 |
| 2,461,646 | Lewis | Feb. 15, 1949 |
| 2,502,974 | McElhannon | Apr. 4, 1950 |
| 2,511,409 | Mayberry | June 13, 1950 |
| 2,610,320 | Hall | Sept. 9, 1952 |
| 2,692,984 | Cohn | Oct. 26, 1954 |